United States Patent [19]

Hallinger

[11] Patent Number: 4,457,668

[45] Date of Patent: Jul. 3, 1984

[54] GAS TURBINE STAGES OF TURBOJETS WITH DEVICES FOR THE AIR COOLING OF THE TURBINE WHEEL DISC

[75] Inventor: Claude C. Hallinger, Le Mee sur Seine, France

[73] Assignee: S.N.E.C.M.A., Paris, France

[21] Appl. No.: 366,134

[22] Filed: Apr. 6, 1982

[30] Foreign Application Priority Data

Apr. 7, 1981 [FR] France ................................ 81 06914

[51] Int. Cl.³ ............................................... F01D 5/08
[52] U.S. Cl. .................................. 416/95; 416/193 A; 416/190; 416/500
[58] Field of Search ..................... 416/95, 193 A, 190, 416/500, 189, 179, 106

[56] References Cited

U.S. PATENT DOCUMENTS

| | | | |
|---|---|---|---|
| 2,603,453 | 7/1952 | Sollinger | 416/95 |
| 3,008,689 | 11/1961 | Morley et al. | 416/193 A |
| 3,085,400 | 4/1963 | Sonder et al. | 416/95 |
| 3,266,771 | 8/1966 | Morley | 416/193 A |

FOREIGN PATENT DOCUMENTS

| | | | |
|---|---|---|---|
| 1300346 | 7/1969 | Fed. Rep. of Germany | 416/95 |
| 341030 | 10/1959 | Switzerland | 416/193 A |

Primary Examiner—Stephen Marcus
Assistant Examiner—John Kwon
Attorney, Agent, or Firm—Oblon, Fisher, Spivak, McClelland & Maier

[57] ABSTRACT

A turbojet turbine stage having air cooling of the turbine wheel disc is disclosed which has, on the one hand, devices for blowing in a flow of air A in the direction of the upstream surface of the disc (20) intended in particular to flow into the several passages delimited by the periphery (22) of the disc and by the shanks (14) and platforms (12) of the blade feet (11) of the wheel, and, on the other hand, a number of trough-shaped dampers (30) each of which is inserted in a passage and supported by its edges against the periphery of the disc while its back pushes against the platforms delimiting the passage. The upstream edge of each damper forms a peak (33) which extends beyond the upstream side of the disc.

7 Claims, 5 Drawing Figures

GAS TURBINE STAGES OF TURBOJETS WITH DEVICES FOR THE AIR COOLING OF THE TURBINE WHEEL DISC

BACKGROUND OF THE INVENTION

1. Field of the invention:

The invention concerns gas turbine stages which entail devices for cooling the periphery of the turbine wheel disc by means of blowing in air in the direction of the upstream side of the disc. It relates in particular to the turbines of aviation turbojets.

2. Description of the Prior Art:

In the turbine stages of the type referred to above, there are two flows of gases which must remain distinct from each other insofar as possible. The first is the circular flow of the combustion gases which drives the blades of the wheel. The other is the flow of air which circulates around the disc and whose role is simultaneously to cool the disc and to balance the pressures between the jet and the upstream and downstream enclosures delimited by the wheel. These gas and air flows are highly centrifuged because of the high speed of operation of the turbine. This phenomenon has one favorable consequence, namely preventing the migration of hot gases toward the disc, and one unfavorable consequence, that of impeding the circulation of the combustion gases by constricting the jet.

It is known that the blades are often provided with platforms. More specifically, the foot of a blade consists of three parts: the blade root which fits into a housing in the periphery of the disc, the shank on top of the root, and finally the platform atop the shank which supports the airfoil portion. The presence of the platform increases the inertia of the blade. It thus lowers the blade's own resonance frequencies and consequently the critical velocity or velocities of the turbine. In addition, when all the platforms of a wheel are interconnected, they make it possible to form a crown which promotes the separation of two flows and, with the periphery of the disc and the shanks, delimit passages which channel the cooling air around those parts of the disc which are most subject to heating. Obviously, this function is provided only when the platforms are interconnected. Even in this case, a significant fraction of the air flow is deflected by the upstream side of the disc and by the upstream surfaces of the blade shanks. This results in a reduction of the yield of the stage because of the turbulent reintroduction of centrifuged cooling air into the flow of combustion gases, as well as in a lack of cooling efficiency.

Another known practice, shown for example in French Pat. No. 1,417,600, is the use of elastic trough-shaped dampers whose function is to dampen the vibrations of the blades and to further lower the frequency of those vibrations. Each of these dampers is inserted in the passage delimited by the shanks of two adjacent blades, the platforms thereof, and the periphery of the disc. The damper takes up one portion of the cross section of the passage and is supported on its edges by the periphery of the disc while its back pushes against the platforms. In operation, each damper is subject to centrifugal force and lowers the resonance frequencies of the neighboring blades by the pull it exerts on the shanks through the intermediary of the platforms. The vibrations are dampened by the friction of the dampers in contact with the platforms.

The purpose of the invention is to take advantage of the presence of such dampers to improve the efficiency of the air circulation on both sides of and around the disc.

SUMMARY OF THE INVENTION

Accordingly, one object of the present invention is to provide a turbine stage, which includes a turbine wheel including a rotor disc and a number of blades each of which has a foot with a blade root fitted into a housing in the periphery of the disc, a shank atop the root and a platform on top of the shank and supporting the airfoil portion of the blade. There are also provided devices for blowing in air in the direction of the upstream side of the disc, which air flows from the upstream side to the downstream side around the disc, through the plurality of passages delimited by the periphery of the disc and by the shanks and platforms of the blade feet. There is also included a number of trough-shaped dampers made of an elastic material, each of which is fitted into a passage and whose edges are supported by the periphery of the disc and whose back pushes against the platform delimiting the passage.

The essential feature of the damper construction is that each damper is shaped and sized in such a way that it occupies nearly the entire cross section of the passage and in that the upstream edge of its back forms a peak which may be flush with the upstream edge of the platforms and extend beyond the upstream side of the disc.

This damper construction is particularly advantageous because the peak of each damper is perpendicular to the plane of the disc, and the small edge of each peak is also curved toward the axis of the wheel, with the peak thus forming a symmetrically-shaped scoop thereby enabling it to tap the centrifuged field of the air in an optimal manner. In the event the effect of centrifuging is relatively slight, the orifice of the scoop could be provided with a circumferential incidence in the direction of rotation.

There is also provided an air passage orifice made in the downstream edge of each damper.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE PREFERRED EMBODIMENTS

Figure 1:
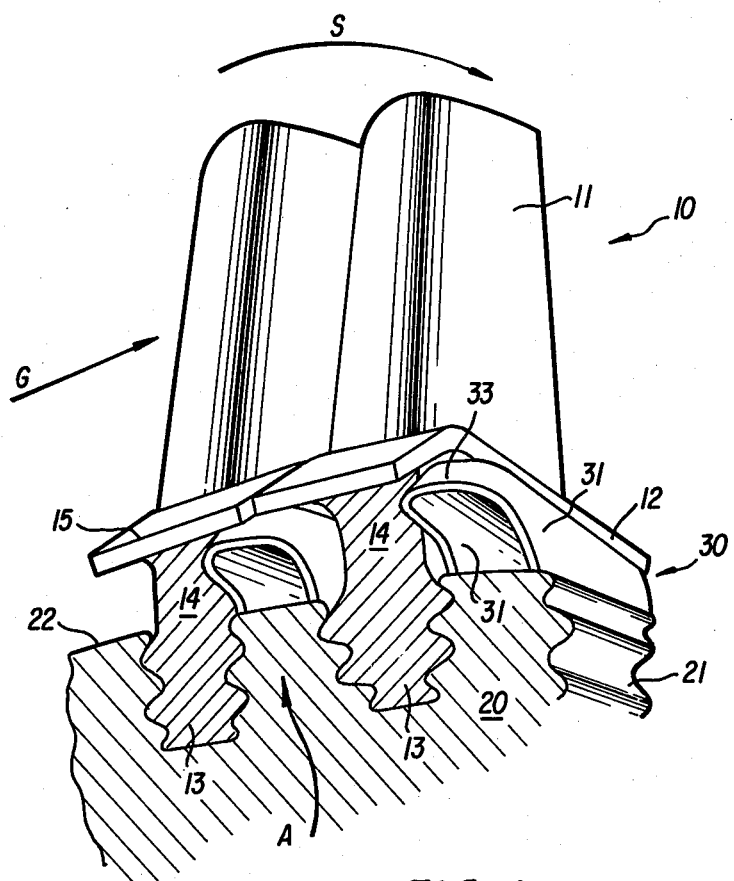
FIG. 1 is a perspective view of a wheel portion of a turbine stage including dampers in accordance with the invention.

Referring now to the drawings, wherein like reference numerals designate identical or corresponding parts throughout the several views, and more particularly to FIG. 1 thereof.

Reference is first made to FIG. 1. In accordance with a conventional arrangement, each airfoil portion 11 of a blade 10 is supported by a foot which consists of a platform 12 (to which the airfoil portion is attached), a root 13 fitted into a housing 21 of complementary shape in the periphery 22 of the disc 20, and finally a shank 14 connecting the root and the platform. The gas flow G drives the blades in direction S. The air flow A, whose general direction is concentric to the gas flow G, circulates in the same direction as the latter. It is obtained by bleeding a fraction of the air flow delivered by the compressor of the stage to which the turbine wheel represented belongs. This compressor is not shown.

Figure 2:
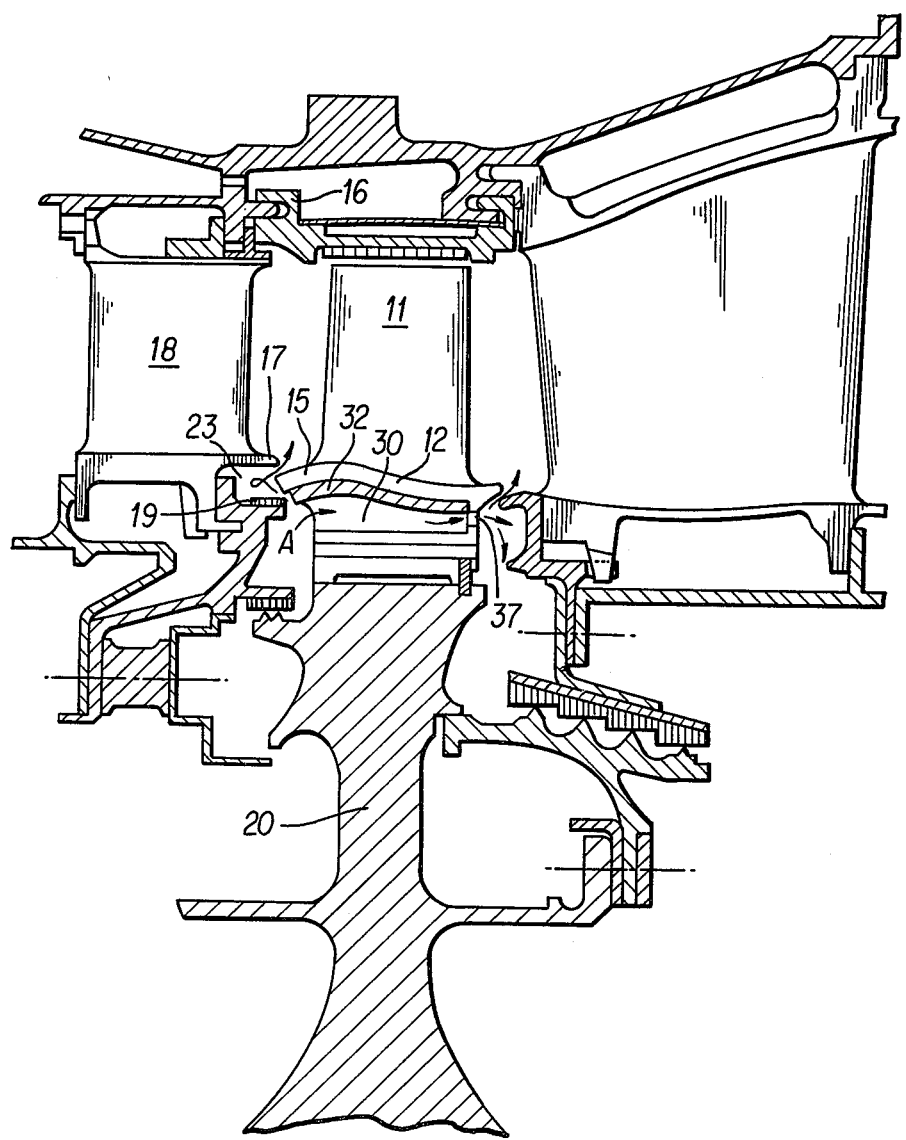
FIG. 2 is an axial cross section of a turbine stage including dampers in accordance with the invention.

With the housing 16 (FIG. 2), the platforms 12 form an annular conduit hereafter called the "jet." The upstream portion of the platforms is curved toward the axis of the machine so that it is radially inside the downstream edge of the internal ferrule of the turbine nozzle preceding the wheel. In this way, the cooling area upstream of the disc 20 emerges into the jet axially or very slightly obliquely. This arrangement reduces the constricting effect of the ventilation air reintroduced into the jet.

A damper such as 30 is inserted into each passage delimited by the shanks 14 of two adjacent feet, the platforms 12 of said feet, and the periphery 22 of the disc 20 which separates them.

Two dampers 30 are represented in FIG. 1 but, for purposes of increased simplicity and clarity, the blade, which would have hidden the first of these dampers described below, has been removed. This damper is made of a shaped piece of thin sheet. The thinness of this sheet gives it a degree of flexibility which enables it, in centrifuging, to be better "seated" in its housing and facilitates mounting. It is trough-shaped with two roughly parallel sides 31 connected by a bottom 32 (see FIGS. 2, 3, 3a and 4). It is shaped and sized in such a way that it occupies nearly all the cross section of the passage and that the edges of the sides 31 are mounted pressed against the periphery of the disc 20 while the bottom 32 is in contact with the delimiting platforms 12.

Reference has already been made to the mechanical function of such a damper, and it need not be repeated here. To enable the damper to perform its aerodynamic function in accordance with the invention, the upstream part 33 of the bottom 32 substantially extends beyond the upstream side of the disc 20 so as to form a peak or scoop which traps a fraction of the air flow A and forces it to pass in contact with the periphery 22 of the disc 20 before opening onto the downstream surface of the disc through an orifice 37 made in the downstream edge of each damper.

The sleeve of the damper 30 channels the cooling air A, centifuged on the upstream side of the turbine disc 20, toward the downstream side of the disc. By selecting the compressor stage where the cold air is bled, and by adjusting the interplay of the different labyrinths and passage cross sections limiting this intake, it is possible to determine the pressure just downstream of the disc 20 such that it is slightly greater than the air pressure in the jet, with the result that there is a slight flow of air A in the latter so as to avoid the reintroduction of the hot gases toward the internal part of the motor. Another (and greater) portion of the air A is intended to ventilate the downstream surface of the disc 20.

The upstream part 33 of the bottom 32 scoops the air centrifuged upstream of the turbine disc 20 and forces it to be directed to the rear. But it also makes it possible to limit the feed pressure of the air A upstream of the disc 20 so as to prevent flows reintroducing air A into the jet.

In order to complete this seal between hot gas circulating in the jet and ventilating air A circulating in the inside parts, on the one hand, the platforms 17 of the fixed blading 18 partially cover the curved parts 15 of the platforms 12 of the movable blades 11, and, on the other hand, the curved parts 15 come into contact with a labyrinth 19 attached to the inside support of the fixed blading 18. In addition to the labyrinth 19, a chamber 23 playing the role of a baffle plate is created. This device prevents possible leaks of ventilating air A from penetrating radially into the jet. This is obtained by the platform covering which forces these leak flows to flow tangentially within the jet.

Figure 3:
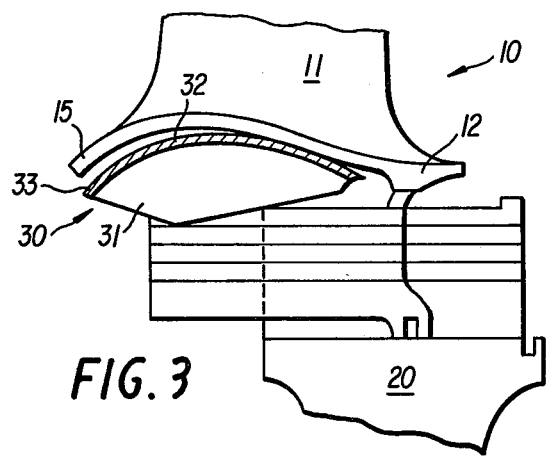
FIG. 3 and 3a are axial cross sections showing the mounting of the dampers according to the invention.
Figure 3A:
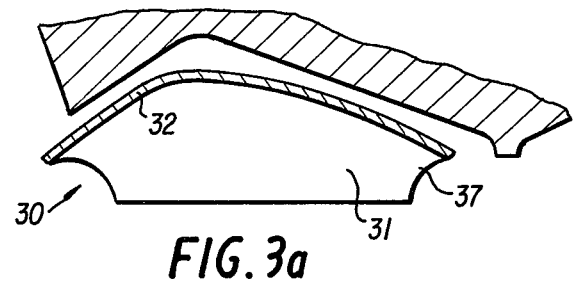

FIGS. 3 and 3a show the installation of a damper 30. This damper is inserted between the shanks 14 and beneath the platforms 12 of the adjacent rotor blades 10 when the latter are not yet fully engaged in the disc. The unit will then be gradually pushed toward the rear of the disc 20 until the unit is in the planned position. The two inclined faces of each of these two platforms, only one of which is represented (FIG. 3a), of two adjacent blades "imprison" the damper 30, keeping the latter from sliding and slipping off to one side or the other.

Figure 4:
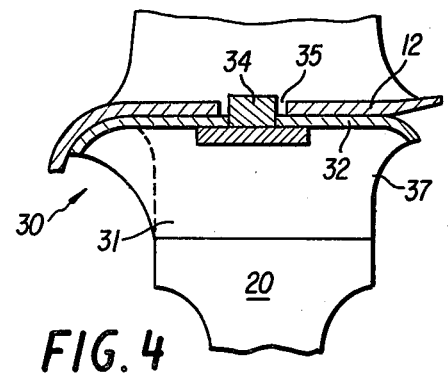
FIG. 4 is an axial cross section showing one way of immobilizing the dampers according to the invention.

FIG. 4 shows another variant for the axial immobilization of the damper 30, made up of a stud 34 brazed onto the bottom 32 of the damper 30, the stud being received in a notch 35 machined into the platform 12 of the blade 10.

It will be noted that the entire device which is the subject of the invention generally makes it possible to avoid drilling through the surface of the disc 20 in order to provide the rear surface of the disc with cool air, which generally also involves different sources (pressure and temperature) for the cooling of the upstream surface and of the downstream surface.

Of course, various modifications may be made by specialists to the devices which have just been described solely by way of nonrestrictive examples without departing from the scope of the invention in so doing.

What is claimed as new and desired to be secured by Letters Patent of the United States is:

1. A gas turbine stage comprising:
(a) a turbine wheel including a rotor disc and a plurality of blades each of which has a foot comprising a blade root fitted into a housing in the periphery of said rotor disc, a shank atop said blade root, and a platform atop said shank, said platform being attached to the airfoil portion of the associated one of said plurality of blades;
(b) means for blowing air in the direction of the upstream side of said rotor disc to create an air flow from the upstream side of said rotor disc, through the plurality of passages delimited by the periphery of said rotor disc, said shanks, and said platforms, to the downstream side of said rotor disc; and
(c) a plurality of trough-shaped vibration dampers made of an elastic material, each of said vibration dampers being fitted into one of said passages such that its bottom portion pushes against the associated one of said platforms, each of said vibration dampers being sized and shaped so that it occupies substantially all the cross section of the associated one of said passages, and the bottom portion of each of said vibration dampers having an upstream edge which extends upstream of the upstream edge of said rotor disc and which is curved toward the axis of said turbine wheel to form an air pickup scoop.

2. A gas turbine stage as recited in claim 1 wherein each of said vibration dampers is immobilized with respect to axial movement by two inclined faces one of which is on each of the two adjacent ones of said platforms.

3. A gas turbine stage as recited in claim 1 wherein each of said vibration dampers is immobilized with respect to axial movement by a stud mounted on the bottom of said damper and received in a notch formed in an adjacent one of said platforms.

4. A gas turbine stage as recited in claim 3 wherein said stud is received in two mating notches one of which is formed in the facing edge of each of the two adjacent ones of said platforms.

5. A gas turbine stage comprising:
(a) a turbine wheel including a rotor disc and a plurality of blades each of which has a foot comprising a blade root fitted into a housing in the periphery of said rotor disc, a shank atop said blade root, and a platform atop said shank, said platform being attached to the airfoil portion of the associated one of said plurality of blades;
(b) means for blowing air in the direction of the upstream side of said rotor disc to create an air flow from the upstream side of said rotor disc, through the plurality of passages delimited by the periphery of said rotor disc, said shanks, and said platforms, to the downstream side of said rotor disc; and
(c) a plurality of trough-shaped vibration dampers made of an elastic material, each of said vibration dampers being fitted into one of said passages such that its bottom portion pushes against the associated one of said platforms, each of said vibration dampers being sized and shaped so that it occupies substantially all the cross section of the associated one of said passages, the bottom portion of each of said vibration dampers having an upstream edge which extends upstream of the upstream edge of said rotor disc, and each of said vibration dampers being immobilized with respect to axial movement by two inclined faces one of which is on each of the two adjacent ones of said platforms.

6. A gas turbine stage comprising:
(a) a turbine wheel including a rotor disc and a plurality of blades each of which has a foot comprising a blade root fitted into a housing in the periphery of said rotor disc, a shank atop said blade root, and a platform atop said shank, said platform being attached to the airfoil portion of the associated one of said plurality of blades;
(b) means for blowing air in the direction of the upstream side of said rotor disc to create an air flow from the upstream side of said rotor disc, through the plurality of passages delimited by the periphery of said rotor disc, said shanks, and said platforms, to the downstream side of said rotor disc; and
(c) a plurality of trough-shaped vibration dampers made of an elastic material, each of said vibration dampers being fitted into one of said passages such that its bottom portion pushes against the associated one of said platforms, each of said vibration dampers being sized and shaped so that it occupies substantially all the cross section of the associated one of said passages, the bottom portion of each of said vibration dampers having an upstream edge which extends upstream of the upstream edge of said rotor disc, and each of said vibration dampers being immobilized with respect to axial movement by a stud mounted on the bottom of said damper and received in a notch formed in an adjacent one of said platforms.

7. A gas turbine stage as recited in claim 6 wherein said stud is received in two mating notches one of which is formed in the facing edge of each of the two adjacent ones of said platforms.

* * * * *